(12) United States Patent
Sawada et al.

(10) Patent No.: US 10,648,572 B2
(45) Date of Patent: May 12, 2020

(54) VALVE WITH BUILT-IN ORIFICE, AND PRESSURE-TYPE FLOW RATE CONTROL DEVICE

(71) Applicant: FUJIKIN INCORPORATED, Osaka (JP)

(72) Inventors: Yohei Sawada, Osaka (JP); Kaoru Hirata, Osaka (JP); Masaaki Nagase, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/310,866

(22) PCT Filed: Jul. 25, 2017

(86) PCT No.: PCT/JP2017/026802
§ 371 (c)(1),
(2) Date: Dec. 18, 2018

(87) PCT Pub. No.: WO2018/021277
PCT Pub. Date: Feb. 1, 2018

(65) Prior Publication Data
US 2019/0178389 A1    Jun. 13, 2019

(30) Foreign Application Priority Data

Jul. 29, 2016  (JP) .................................. 2016-150742

(51) Int. Cl.
*F16K 7/14*   (2006.01)
*F16K 1/52*   (2006.01)
(Continued)

(52) U.S. Cl.
CPC .................. *F16K 1/52* (2013.01); *F16K 1/42* (2013.01); *F16K 7/14* (2013.01); *F16K 27/0236* (2013.01);
(Continued)

(58) Field of Classification Search
USPC .......................................................... 251/118
See application file for complete search history.

(56) References Cited

U.S. PATENT DOCUMENTS 3,870,077 A * 3/1975 Nakamura ............... F16K 47/02
137/614.11
5,855,355 A * 1/1999 Grunert ................. F16K 31/404
138/45
(Continued)

FOREIGN PATENT DOCUMENTS

JP    3522535 B2    4/2004
JP    4137267 B2    8/2008
(Continued)

OTHER PUBLICATIONS

International Search Report issued in PCT/JP2017/026802; dated Sep. 12, 2017.

*Primary Examiner* — John Fox
(74) *Attorney, Agent, or Firm* — Studebaker & Brackett PC

(57) ABSTRACT

A valve with a built-in orifice includes a base section having a housing recess and first and second flow passages; a valve seat body; an inner disc; a valve element; and an orifice body, wherein the housing recess has a wide-diameter section and a narrow-diameter section, the first flow passage is connected to a space between a wall surface of the narrow-diameter section and the orifice body to communicate with a valve chamber, and the second flow passage communicates
(Continued)

with the valve chamber through a through hole of the orifice body and a through hole of the valve seat body.

11 Claims, 8 Drawing Sheets

(51) Int. Cl.
    *G05D 7/06*         (2006.01)
    *F16K 27/02*        (2006.01)
    *F16K 1/42*         (2006.01)
    *G01F 1/42*         (2006.01)

(52) U.S. Cl.
    CPC ............... *G01F 1/42* (2013.01); *G05D 7/06* (2013.01); *G05D 7/0635* (2013.01)

(56) References Cited

U.S. PATENT DOCUMENTS

| | | | |
|---|---|---|---|
| 6,289,923 B1 | 9/2001 | Ohmi et al. | |
| 6,357,677 B1* | 3/2002 | Ren | F02M 51/0671 |
| | | | 239/585.4 |
| 7,150,444 B2* | 12/2006 | Ohmi | F16K 7/14 |
| | | | 251/118 |
| 8,251,348 B2* | 8/2012 | Robison | F16K 25/04 |
| | | | 251/118 |
| 9,133,951 B2 | 9/2015 | Ohmi et al. | |
| 2010/0116910 A1* | 5/2010 | Girlinger | F02M 47/027 |
| | | | 239/533.3 |
| 2017/0212531 A1 | 7/2017 | Nagase et al. | |

FOREIGN PATENT DOCUMENTS

| | | |
|---|---|---|
| JP | 4690827 B2 | 6/2011 |
| JP | 2016-024708 A | 2/2016 |

* cited by examiner

VALVE WITH BUILT-IN ORIFICE, AND PRESSURE-TYPE FLOW RATE CONTROL DEVICE

TECHNICAL FIELD

The present invention relates to a valve with a built-in orifice. It particularly relates to a valve with a built-in orifice for use in a pressure-type flow rate control device, for example.

BACKGROUND ART

In semiconductor manufacturing devices and chemical plants, various types of flowmeters and flow rate control devices have been used in order to control fluids, such as a raw material gas and an etching gas. Among them, a pressure-type flow rate control device is capable of precise flow rate control for various fluids with a relatively simple mechanism formed of a combination of a piezo-actuated control valve and a restriction part (orifice plate, critical nozzle, etc.), for example, and thus has been widely used.

In some pressure-type flow rate control devices, the flow rate is controlled using the principle that when a critical expansion condition P1/P2≥about 2 (P1: gas pressure on the upstream side of the restriction part, P2: gas pressure on the downstream side of the restriction part) is satisfied, the flow rate determined not by the downstream-side gas pressure P2 but by the upstream-side gas pressure P1. In a pressure-type flow rate control device of this type, simply by controlling the upstream pressure P1 using a pressure sensor and a control valve, the flow rate of the gas flowing on the downstream side of the restriction part can be precisely controlled.

Patent Document 1 discloses a pressure-type flow rate control device, which is the pressure-type flow rate control device described above and has an open/close valve including a built-in orifice as a restrictor (valve with a built-in orifice). In this pressure-type flow rate control device, the pressure on the orifice upstream side is controlled by the control valve, and also the gas outflow is controlled by the valve with a buiit-in orifice, making it possible to supply a gas at a controlled flow rate with high step-up and step-down characteristics.

In recent years, in the ALD (atomic layer deposition) process or ALE (atomic layer etching) process, it is desirable to supply a gas to a process chamber only for a short period of time, and thus it is desirable to utilize a pressure-type flow rate control device including a valve with a built-in orifice having the above characteristics.

With respect to the specific structure of a valve with a built-in orifice, various modes will be possible. For example, a metal diaphragm valve as described in FIG. 4 of Patent Document 2 has been conventionally used. In FIG. 4 of Patent Document 2, an orifice plate secured to a holder by laser welding is housed in a concavity formed in a valve seat body, and is sandwiched and secured between the valve seat body and the holder. The valve seat body is pressed and secured by an inner disc having a through-hole for the flow of the fluid.

However, in the case of using an orifice plate secured by welding to a holder or the like as described above (particularly in the case of using a thin orifice plate), due to the influence of welding heat, cracking may occur, or corrosion resistance may decrease.

CITATION LIST

Patent Literature

Patent Document 1: Japanese Patent No. 3522535
Patent Document 2: Japanese Patent No. 4137267
Patent Document 3: Japanese Laid-Open Patent Publication No. 2016-24708
Patent Document 4: Japanese Patent No. 4690827

SUMMARY OF INVENTION

Technical Problem

In recent years, in the field of semiconductor manufacturing devices and the like, smaller gas supply systems have been desired, and there has also been a demand for smaller orifice-built-in valves.

For example, Patent Document 2 describes a configuration in which a holder and an orifice plate are housed in a recess provided in the back surface of a valve seat body. However, there has been a problem in that the size of the valve seat body increases, whereby the height of the valve mechanism disposed thereon is likely to increase. In addition, Patent Document 2 also describes a configuration in which an orifice is provided to a valve seat body itself. However, in this case, although size reduction can be achieved, it has been difficult to enhance the shape accuracy of the orifice.

The present invention has been accomplished in view of the demands and problems described above, and relates to a valve with a built-in orifice and also to a pressure-type flow rate control device having the same.

Solution to Problem

A valve with a built-in orifice according to an embodiment of the present invention is a valve with a built-in orifice, which internally includes an orifice. The valve with a built-in orifice includes: a base section having a top-opening housing recess, a first gas flow passage opening to a wall surface of the housing recess, and a second gas flow passage opening to a bottom surface of the housing recess; a valve seat body having an annular valve seat and a through-hole formed on an inner side of the valve seat; an inner disc for holding and securing the valve seat body; a valve element capable of coming in and out of contact with the valve seat; and an orifice body having a through-hole including the orifice. The housing recess is a stepped recess having a wide-diameter section and a narrow-diameter section opening to a bottom surface of the wide-diameter section, the wide-diameter section includes a valve chamber defined by the valve seat body, the inner disc, and the valve element, and the narrow-diameter section has inserted therein the orifice body. The valve seat body is mounted on the orifice body, and is pressed by the inner disc and thereby held and secured on top of the orifice body. The first gas flow passage communicates with the valve chamber through a space between a wall surface of the narrow-diameter section and the orifice body, and the second gas flow passage communicates with the valve chamber through a through-hole of the orifice body and the through-hole of the valve seat body.

In one embodiment, the base section further comprises a third gas passage opening to the wall surface of the housing recess.

In one embodiment, the orifice body has in a side surface thereof a passage communicating with the through-hole of the orifice body.

In one embodiment, the orifice body includes a first metal member having a through-hole, a second metal member having a through-hole, and an orifice plate provided with the orifice and sandwiched between the first metal component and the second metal component. The first metal member has a recess or projection on the side facing the second metal member, the second metal member has a projection or recess shaped to fit with the recess or projection of the first metal member, and the orifice plate is hermetically sandwiched between the recess or projection of the first metal member and the projection or recess of the second metal member.

In one embodiment, an annular protrusion is provided on at least one of a surface of the first metal member facing the second metal member and a surface of the second metal member facing the first metal member.

In one embodiment, the valve with a built-in orifice further includes an annular sealing member sealing between the orifice body and the bottom of the narrow-diameter section.

In one embodiment, the orifice body has formed on an upper end surface thereof a step upper surface and a step lower surface formed to have a smaller height than the step upper surface, and the inner disc does not contact with the upper end surface of the orifice body.

In one embodiment, the upper end surface of the orifice body and the bottom surface of the wide-diameter section are approximately the same in height.

In one embodiment, the inner disc is mounted on the bottom surface of the wide-diameter section.

In one embodiment, the valve element is a metal diaphragm, and the metal diaphragm is sandwiched and secured between the inner disc and a pressing member pressing the inner disc from above.

A pressure-type flow rate control device according to an embodiment of the present invention includes a control valve, a pressure sensor, a computation control unit, and the valve with a built-in orifice according to any one of the above.

Advantageous Effects of Invention

According to embodiments of the present invention, a valve with a built-in orifice having improved sealing properties and orifice-holding properties without size increase is provided, and also a pressure-type flow rate control device having the same is provided.

DESCRIPTION OF EMBODIMENTS

Hereinafter, embodiments of the present invention will be described with reference to the drawings, but the present invention is not limited to the following embodiments.

Embodiment 1

Figure 1:
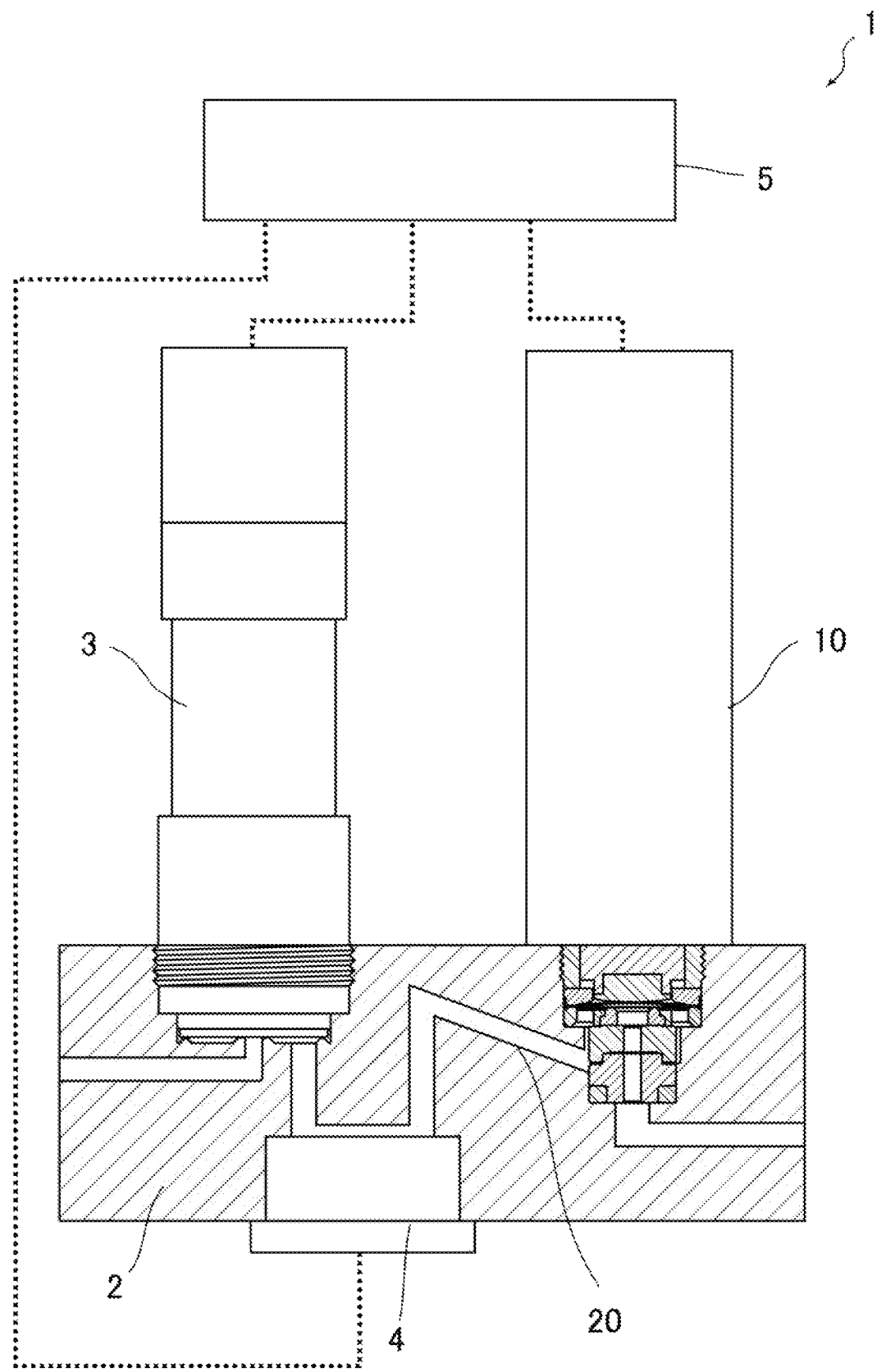
FIG. 1 A schematic diagram showing an example of a pressure-type flow rate control device including a valve with a built-in orifice according to Embodiment 1 of the present invention.

FIG. 1 is a schematic diagram showing the entire configuration of a pressure-type flow rate control device 1 including a valve with a built-in orifice 10 according to Embodiment 1 of the present invention. As shown in FIG. 1, in a base section 2 of the pressure-type flow rate control device 1, a gas flow passage 20 is formed. The pressure-type flow rate control device 1 includes a control valve 3 provided in the flow passage 20, a pressure sensor 4 provided on the downstream side of the control valve 3, the valve with a built-in orifice 10 provided on the downstream side of the pressure sensor 4, and a computation control unit 5. The upstream side of the pressure-type flow rate control device 1 is connected to a gas supply source (not shown), for example, and the downstream side is connected to a process chamber of a semiconductor manufacturing device (not shown), for example.

The computation control unit 5 is configured to be capable of feedback-controlling the control valve 3 based on the pressure detected by the pressure sensor 4, and the gas pressure on the upstream side of the valve with a built-in orifice 10 can be controlled to a desired pressure. In the state where the valve of the valve with a built-in orifice 10 is open, a gas is supplied at a controlled flow rate to the process chamber through the orifice provided in the valve with a built-in orifice 10.

In another mode, the pressure-type flow rate control device 1 may also include a temperature sensor for measuring the gas temperature on the orifice upstream side, a downstream-side pressure sensor that measures the pressure on the downstream side of the valve with a built-in orifice 10, and the like. In this case, the computation control unit 5 can feedback-control the control valve 3 based on the output of the temperature sensor and the output of each of the pressure sensors provided on the orifice upstream side and downstream side. The computation control unit 5 may be formed of a processor, a memory, and the like provided on a circuit board, for example. The computation control unit 5 includes a computer program that executes predetermined computation based on an input signal and can be realized by a combination of hardware and software. The computation control unit 5 may also be configured to control the opening and closing of the valve of the valve with a built-in orifice 10.

Figure 2:
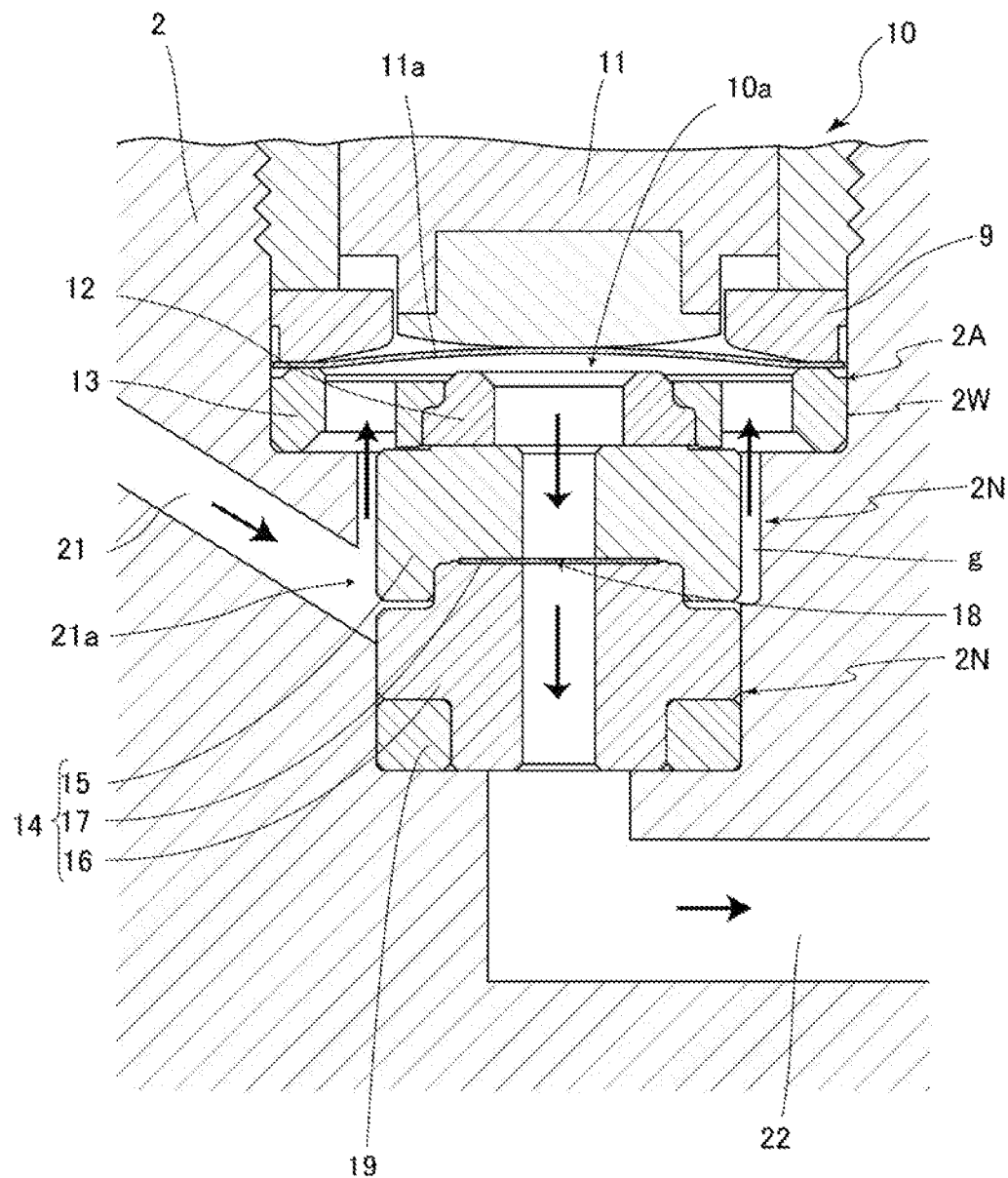
FIG. 2 A partially enlarged view of the valve with a built-in orifice according to Embodiment 1 of the present invention.

FIG. 2 is a cross-sectional view of the major part of the valve with a built-in orifice 10 of this embodiment. As shown in FIG. 2, the valve with a built-in orifice 10 is installed in a top-opening housing recess 2A provided in the base section 2. In the base section 2, in addition to the housing recess 2A, a gas inflow passage 21 communicating with the control valve 3 (see, FIG. 1) and a gas outflow passage 22 communicating with a process chamber are formed. The gas inflow passage 21 opens to the wall surface of the housing recess 2A, and the gas outflow passage 22 opens to the bottom surface of the housing recess 2A.

Although FIG. 2 shows a mode in which a fluid flows in from the gas inflow passage 21 and flows out from the gas outflow passage 22, the pressure-type flow rate control device 1 may also be configured such that a fluid flows in from the gas outflow passage 22 and flows out from the gas inflow passage 21. As used herein, one of the gas inflow passage and the gas outflow passage may be referred to as a first gas flow passage, referring to the other as a second gas flow passage. In this embodiment, the gas inflow passage is provided as a first gas flow passage, and the gas outflow passage 22 is provided as a second gas flow passage. However, as described above, in the case where the gas flow in the valve with a built-in orifice is opposite, the gas outflow passage is provided as a first gas flow passage, and the gas inflow passage is provided as a second gas flow passage. In addition, as described later as Embodiment 2, in the case where still another flow passage is provided, both the first gas flow passage and the second gas flow passage may serve as gas inflow passages, or both the first gas flow passage and the second gas flow passage may serve as gas outflow passages.

In the housing recess 2A, a valve main body 11 is inserted and attached. The valve main body 11 may be a known valve main body including a valve element 11a (e.g., metal diaphragm) and a valve actuator that actuates the valve element (e.g., pneumatic actuator), for example.

Below the valve main body 11, a valve seat body 12 made of resin disposed to be capable of coming in contact with and coming out of contact with the valve element 11a, an inner disc 13 holding the valve seat body 12, and an orifice body 14 disposed below the valve seat body 12 are housed. In this embodiment, the orifice body 14 is made of metal, and is provided as a separate body from the valve seat body 12 made of resin (e.g., made of PCTFE).

In this embodiment, the housing recess 2A is in the shape of a stepped recess and includes an upper wide-diameter section 2W and a lower narrow-diameter section 2N provided in the bottom surface of the wide-diameter section 2W. The valve seat body 12 and the inner disc 13 are housed in the wide-diameter section 2W, and the orifice body 14 is inserted in the narrow-diameter section 2N. The upper surface of the orifice body 14 (the upper surface of the first metal member described below) and the bottom surface of the wide-diameter section 2W are set to be approximately the same in height. In this configuration, the inner disc 13 is mounted on the bottom surface of the wide-diameter section 2W, and a valve chamber 10a surrounded by the inner disc 13, the valve element 11a, and the valve seat body 12 is formed in the wide-diameter section 2W.

The inner disc 13 holds the valve seat body 12 and is also pressed by the pressing member 9 from above against the bottom surface of the wide-diameter section 2W. Between the inner disc 13 and the pressing members 9, the peripheral edge portion of the valve element 11a, which is a metal diaphragm, is sandwiched and secured.

Figure 3:
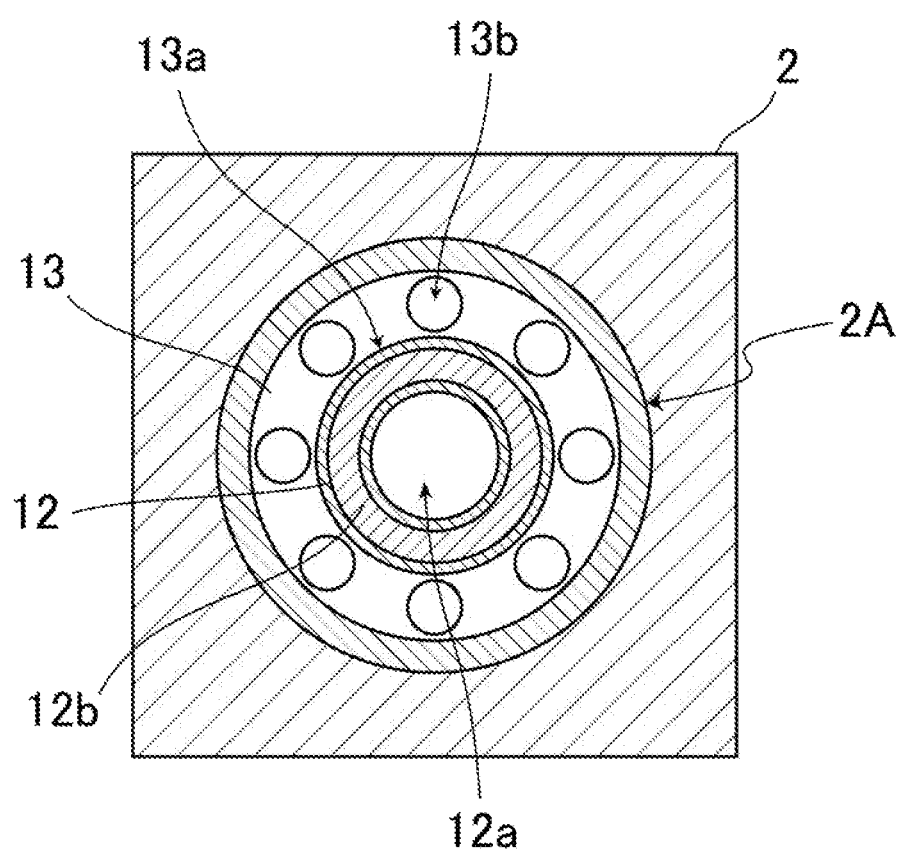
FIG. 3 A plan view showing the valve with a built-in orifice according to Embodiment 1 of the present invention, without a valve main body attached.

FIG. 3 is a plan view of the housing recess 2A without the valve main body 11 attached. As shown in FIG. 3, the inner disc 13 has, in its center, an opening 13a for holding the valve seat body 12, and also has a plurality of gas inflow holes 13b around the opening 13a. Meanwhile, in the central portion of the valve seat body 12, a through-hole 12a that forms a gas flow passage is provided, and an annular valve seat 12b is provided to surround the through-hole 12a (region of contact with the valve element 11a).

With reference to FIG. 2 again, the orifice body 14 has a first metal member 15 and a second metal member 16 provided as holding members, and also an orifice plate 17 made of metal sandwiched between the first metal member 15 and the second metal member 16. In the central portion of the orifice plate 17, an orifice 18 is formed. The thickness of the orifice plate 17 is 10 µm to 500 µm, for example, and the aperture diameter of the orifice 18 is 10 µm to 500 µm, for example.

Figure 4:
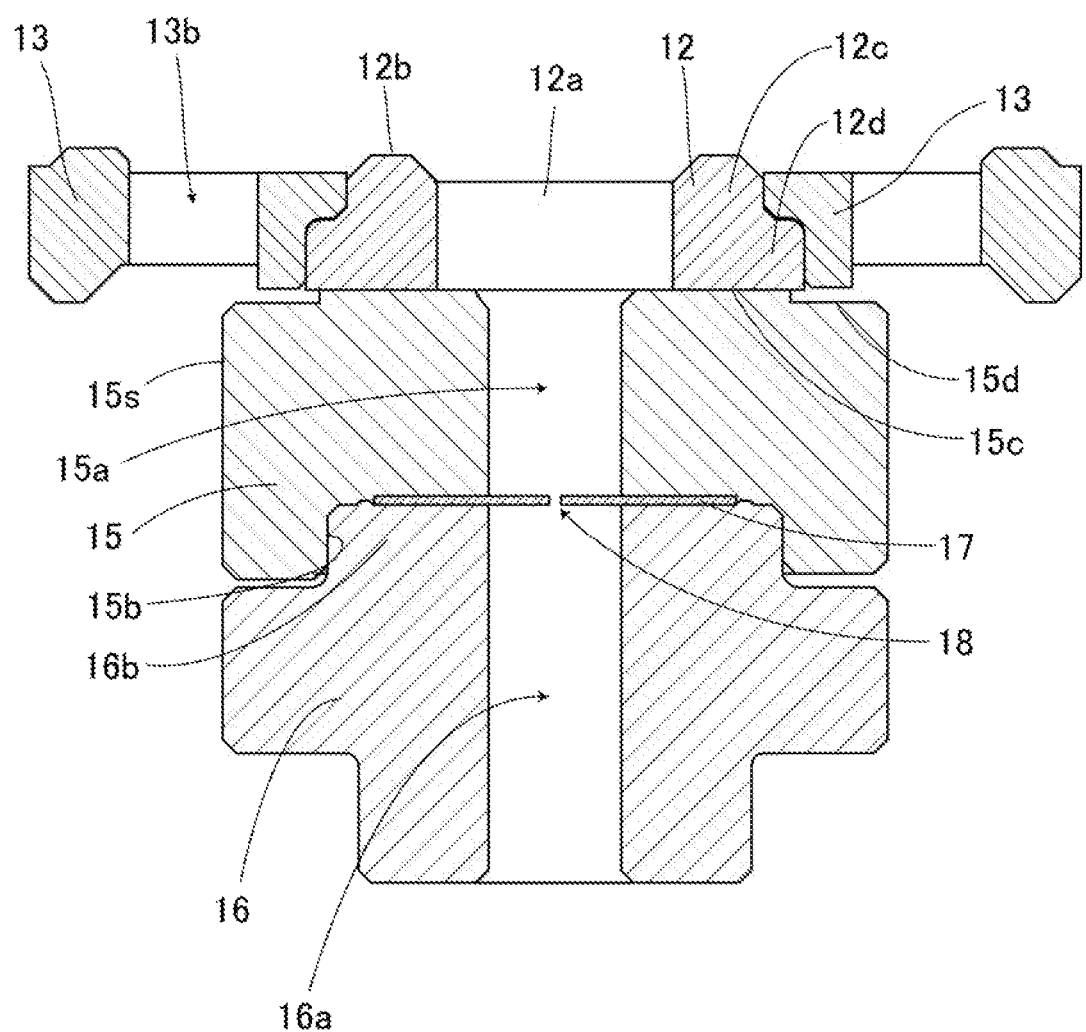
FIG. 4 A diagram schematically showing an inner disc, a valve seat body, and an orifice body of the valve with a built-in orifice shown in FIG. 2.

In addition, as is clear from FIG. 2 and FIG. 4, along the central axis of the first metal member 15, a through-hole 15a communicating with the through-hole 12a of the valve seat body 12 is formed. Similarly, along the central axis of the second metal member 16, a through-hole 16a communicating with the gas outflow passage 22 formed in the base section 2 is formed. In the orifice plate 17, the orifice 18 is formed to communicate with the through-holes 15a and 16a of the first and second metal members 15 and 16. As used herein, the passage including the through-holes 15a and 16a of the first and second metal members 15 and 16 and the orifice 18 may be described as a through-hole of the orifice body 14.

In this configuration, when the valve with a built-in orifice 10 is open, a gas that has run from the gas inflow passage 21 through the gas inflow hole 13b of the inner disc 13 and flowed into the valve chamber 10a runs through the gap between the valve element 12a and the valve seat 12b and flows to the through-hole 12a of the valve seat body 12. In addition, the gas that has passed through the through-hole 12a of the valve seat body 12 runs, in the orifice body 14, successively through the through-hole 15a of the first metal member 15, the orifice 18, and the through-hole 16a of the second metal member 16 (i.e., runs through the through-hole of the orifice body 14) and flows to the gas outflow passage 22.

In the valve with a built-in orifice 10 of this embodiment, the first metal member 15 and the second metal member 16 constituting the orifice body 14 have a recess 15b and a projection 16b, respectively, which are shaped to match each other. Then, the recess 15b and the projection 16b are fit with each other with the orifice plate 17 interposed between, and staked to each other by applying pressure from outside or by press-fitting. In order to firmly maintain staking, it is preferable to provide a protrusion, a fitting groove, or the like on at least one of the inner peripheral surface of the recess 15b and the outer peripheral surface of the projection 16b. Needless to say, in other modes, it is also possible that the first metal member 15 has a projection, and the second metal member 16 has a fitting recess.

The first metal member 15, the second metal member 16, and the orifice plate 17 may be made of the same metal material (e.g., stainless steel (SUS316L-P (W melt)), etc.) or may also be made of different metal materials.

Figure 5:
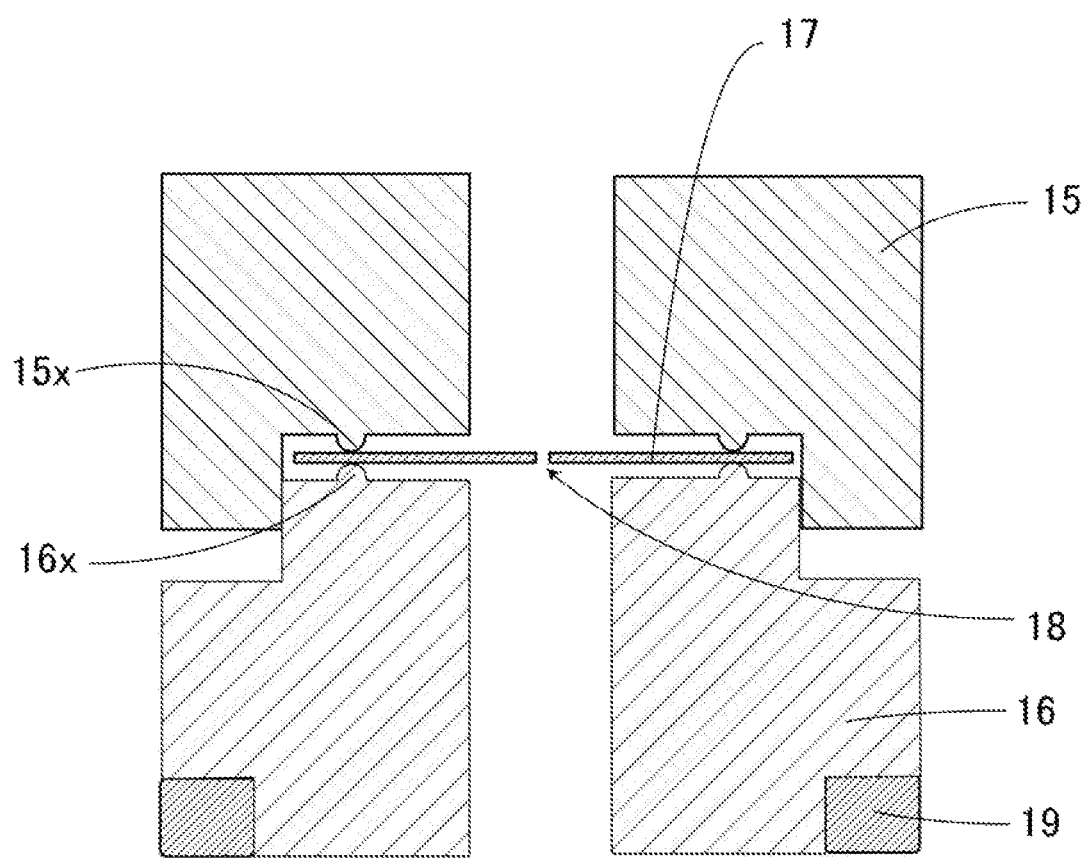
FIG. 5 A cross-sectional view showing an example of the configuration of the valve with a built-in orifice according to Embodiment 1 of the present invention, in which a member constituting the orifice body is provided with an annular protrusion.

As shown in FIG. 5, it is also possible that the facing surfaces of the recess 15b and the projection 16b are provided with annular protrusions 15x and 16x, and sealing is performed by the protrusions 15x and 16x. The protrusions 15x and 16x may be configured to crush upon the integral securing of the orifice body 14, thereby improving the sealing properties. As shown in FIG. 5, the protrusions 15x and 16x may be provided to surround the through-hole (orifice) of the orifice plate and sandwich the orifice plate 17, or may also be provided outside the orifice plate 17 to surround the periphery of the orifice plate 17. In addition, it is also possible that only either of the recess 15b and the projection 16b is provided with such a protrusion.

In this embodiment, the orifice body 14 including the orifice plate 17 is integrated by staking the metal members to each other (i.e., integrally secured). Thus, the influences of welding heat on the orifice, which occur in the case of welding the orifice plate 17, that is, problems such as the occurrence of cracking and a decrease in corrosion resistance, are not caused. Then, even an extremely thin orifice plate can be appropriately disposed on a flow passage while keeping the airtightness.

In addition, in this mode, the valve seat body 12, the inner disc 13, and the orifice body 14 are housed in the housing recess 2A provided in the base section 2. Therefore, the valve with a built-in orifice 10 can be configured without increasing the height of the valve main body 11 disposed thereabove, making it possible to realize space saving.

With respect to the configuration for staking the orifice plate 17 to a holding member (orifice base), examples are described in Japanese Laid-Open Patent Publication No. 2016-24708 (Patent Document 3) and U.S. Pat. No. 4,690,827 (Patent Document 4). Also in an embodiment of the present invention, a conventional staking method can be used to produce an orifice body 14 which the orifice plate 17 is secured between the first metal member 15 and the second metal member 16.

In addition, as enlarged and shown in FIG. 4, in the valve with a built-in orifice 10 of this embodiment, an end surface of the first metal member 15 constituting the orifice body 14 is provided with a step upper surface 15c and a step lower surface 15d formed to have a smaller height. On the end surface of the first metal member 15, the step upper surface 15c is formed at an inner portion closer to the through-hole 15a, while the step lower surface 15d is formed at a peripheral edge portion outside the step upper surface 15c.

Further, the valve seat body 12 is mounted on the end surface of the first metal member 15. More specifically, the valve seat body 12 is mounted such that the back side of the valve seat body 12 contacts the step upper surface 15c and does not contact the step lower surface 15d. Here, typically, the outer diameter of the first metal member 15 is designed to be greater than the outer diameter of the back side of the valve seat body 12, and the valve seat body 12 is disposed on the end surface of the first metal member 15 (particularly on the step upper surface 15c) without covering the outer side surface 15s.

In this embodiment, the valve seat body 12 has a plug portion 12c, which has the valve seat 12b provided on its end surface, and a flange portion 12d, which has a wider diameter than the plug portion 12c, and has preferably hermetically inserted and attached to a matching-shaped opening formed in the inner disc 13. In this configuration, the flange portion 12d of the valve seat body 12 is sandwiched between the inner disc 13 and the step upper surface 15c of the first metal member 15. In addition, the inner disc 13 is disposed to almost cover the outside of the step upper surface 15c, and, in the state shown in FIG. 4, the lower surface of the inner disc 13 faces the step lower surface 15d with a small gap therebetween. In this configuration, the contact between the lower surface of the inner disc 13 and the upper end surface of the first metal member 15 is avoided.

In the above mode, after the orifice body 14 is housed in the housing recess 2A, the valve seat body 12 held by the inner disc 13 is disposed thereon; as this time, the back surface of the valve seat body 12 contacts the step upper surface 15c of the first metal member 15. Further, the inner disc 13 is pressed from above through the pressing member 9 by, for example, screwing the valve main body 11. As a result, the flange portion 12d of the valve seat body 12 is pressed against the step upper surface 15c of the first metal member 15, and the adhesion between the step upper surface 15c and the back surface of the valve seat body 12 is enhanced. Accordingly, the sealing properties between the inlet side and the outlet side of the valve element 11 can be maintained high. In the above securing mode, at the time when the valve seat body 12 is disposed, the lower surface of the inner disc 13 and the step lower surface 15d of the first metal member 15 do not contact each other. However, when the inner disc 13 is pressed, the peripheral edge portion of the inner disc 13 is deformed, whereby the lower surface of the inner disc 13 and the step lower surface 15d of the first metal member 15 can contact each other. As a result of this, the valve seat body 12 is appropriately deformed, and the sealing properties are enhanced. The inner disc 13 may be a member made of metal, for example, and the pressing member 9 may be a member made of resin, for example. However, embodiments of the present invention is not limited thereto, and they both may be members made of metal. Incidentally, in this configuration, the valve seat body 12 can be formed as a relatively small member, which is advantageous in that the size in height direction can be reduced.

Next, the gas flow passages in the housing recess 2A and the sealing structure will be described in further detail. As shown in FIG. 2, above the gas inflow passage (first gas flow passage) 21 provided in the base section 2, a gap g is provided between the wall surface of the narrow-diameter section 2N (orifice body 14 housing part) of the housing recess 2A and at least part of the outer side surface of the orifice body 14 (first metal member 15). Meanwhile, below the gas inflow passage 21, the wall surface of the narrow-diameter section 2N and at least part of the outer side surface of the orifice body 14 (second metal member 16) are disposed without a gap. In the mode shown in the figure, the opening 21a of the gas inflow passage 21 faces the side surface of the first metal member 15 and the side surface of the second metal member 16. However, the opening 21a may face only the side surface of the first metal member 15 or may also face only the side surface of the second metal member 16.

In this embodiment, the first metal member 15 and the second metal member 16 are the same in diameter, and also, above the gas inflow passage 21, the narrow-diameter section 2N slightly increases in diameter, thereby forming the gap g described above. However, embodiments of the present invention is not limited thereto, and it is also possible that the narrow-diameter section 2N is formed to have a constant diameter, and the diameter of the first metal member 15 is designed to be smaller than the diameter of the second metal member 15, thereby forming a gap g between the wall surface of the narrow-diameter section 2N and the orifice body 14.

In addition, in order to prevent communication between the gas inflow passage 21 and the gas outflow passage 22 on the bottom surface side of the narrow-diameter section 2N, an annular sealing member 19 is provided on the gas outflow passage 22-side end surface of the second metal member 16. The sealing member 19 may be an annular member made of resin or rubber (O-ring, etc.), for example.

In the above configuration, a gas that has flowed in from the gas inflow passage 21 runs through the flow passage that is in contact with the outer side surfaces of the first metal member 15 and the second metal member 16 (the gap g between the wall surface of the narrow-diameter section 2N and the first metal member 15), then flows to the plurality of gas inflow holes 13b of the inner disc 13, and flows into the valve chamber 10a. The first metal member 15 and the second metal member 16 are air-tightly secured preferably using the annular protrusions 15x and 16x as shown in FIG. 5, and the sealing properties between the outer side surfaces and the through-holes 15b and 16b are kept high. Therefore, leakage is prevented from occurring on the upstream side and the downstream side of the valve chamber 10a.

In addition, below the narrow-diameter section 2N, the second metal member 16 is housed in close contact without a gap, and also the sealing member 19 is provided on the bottom surface of the narrow-diameter section 2N. Therefore, leakage on the bottom surface portion of the housing recess 2A is also prevented. Like this, in the valve with a built-in orifice 10, even in the case of using an orifice body 14 produced by staking, sufficient measures against leakage are taken, and the flow rate can be appropriately controlled.

Embodiment 2

Hereinafter, a valve with a built-in orifice of Embodiment 2 will be described with reference to FIG. 6 and FIG. 7. In the following description, the same components as in Embodiment 1 will be indicated with the same reference signs, and the detailed description thereof may be omitted.

Figure 6:
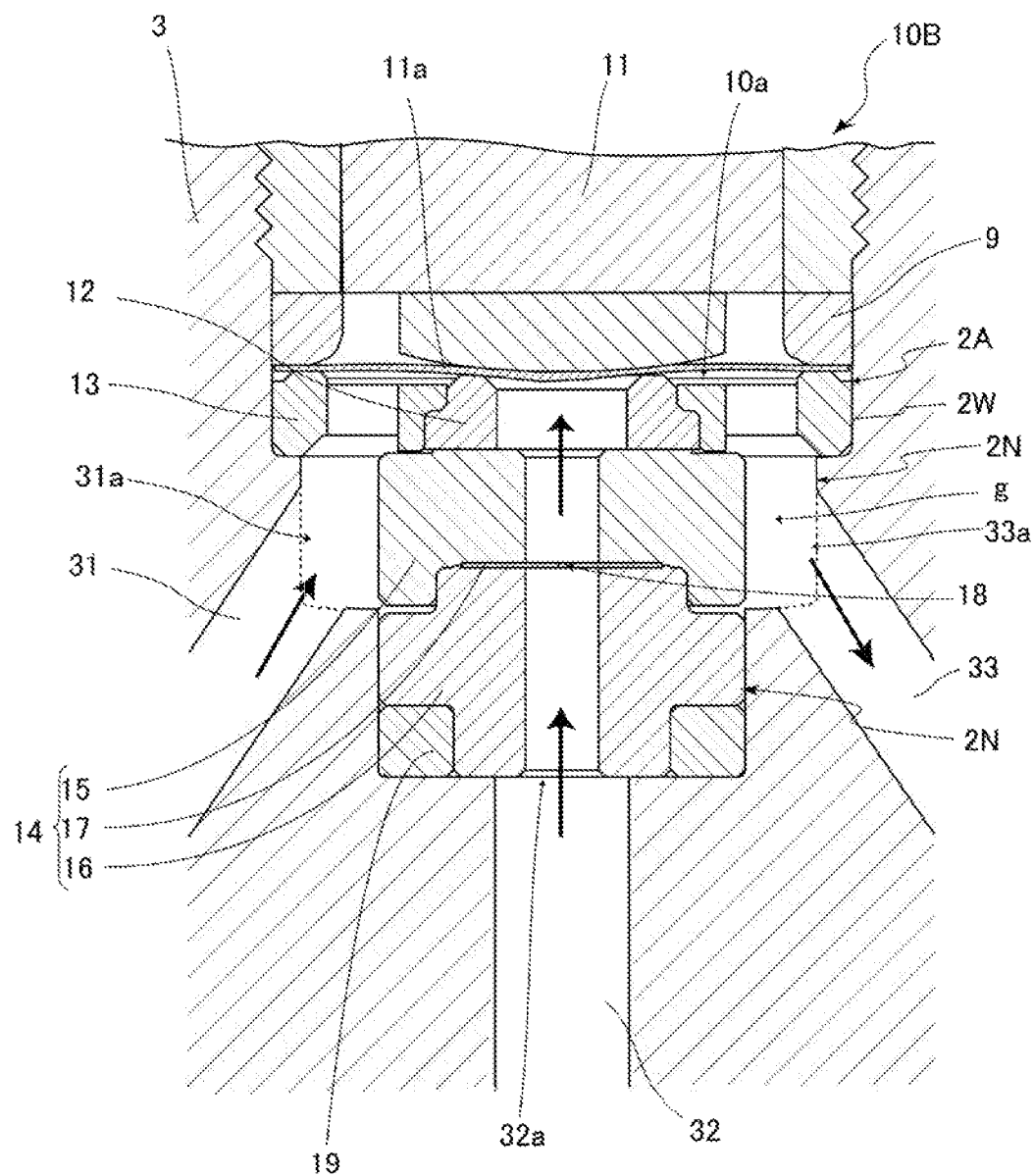
FIG. 6 A partially enlarged view of a valve with a built-in orifice according to Embodiment 2 of the present invention.

FIG. 6 shows a valve with a built-in orifice 10B of Embodiment 2. The valve with a built-in orifice 10B of Embodiment 2 is used as a three-way valve, and three gas flow passages communicating with a housing recess 2A (particularly a narrow-diameter section 2N), that is, a first gas flow passage 31, a second gas flow passage 32, and a third gas flow passage 33, are provided in a base section 3.

In the valve with a built-in orifice 10B, the first gas flow passage 31 is used as an inflow passage for a first gas, and the second gas flow passage 32 is used as an inflow passage for a second gas. In addition, the third gas flow passage 33 is connected to a process chamber or the like and used as a gas outflow passage. In this mode, a first gas can be flowed from the first gas flow passage 31 to the third gas flow passage 33, and a second gas can be flowed from the second gas flow passage 32 to the third gas flow passage 33.

Also in this embodiment, as in Embodiment 1, the housing recess 2A provided in the base section 3 is in the shape of a stepped recess and includes an upper wide-diameter section 2W and a lower narrow-diameter section 2N opening to the bottom surface of the wide-diameter section 2W. A valve seat body 12 and an inner disc 13 are housed in the wide-diameter section 2W, and an orifice body 14 is inserted in the narrow-diameter section 2N. Above the valve seat body 12 and the inner disc 13, a valve main body 11 including a valve element 11a is disposed, and a valve chamber 10a is formed between the valve element 11a, the inner disc 13, and the valve seat body 12. In addition, the upper surface of the orifice body 14 and the bottom surface of the wide-diameter section 2W are set to be approximately the same in height. The orifice body 14, the valve seat body 12, and the inner disc 13 in the valve with a built-in orifice 10B are configured in the same manner as in the valve with a built-in orifice 10 of Embodiment 1, and thus the detailed description thereof will be omitted here.

The first gas flow passage 31 and the third gas flow passage 33 open to the wall surface of the housing recess 2A, while the second gas flow passage 22 opens to the bottom surface of the housing recess 2A. More specifically, an opening 31a of the first gas flow passage 31 and an opening 33a of the third gas flow passage 33 are provided in the wall surface of the narrow-diameter section 2N so as to communicate with a gap g between the wall surface of the narrow-diameter section 2N of the housing recess 2A (orfice body 14 housing part) and the outer side surface of the orifice body 14, and an opening 32a of the second gas flow passage 32 is provided in the bottom surface of the narrow-diameter section 2N of the housing recess 2A.

In the configuration described above, the first gas flow passage 31 and the third gas flow passage 33 always communicate with each other through the gap g. Therefore, regardless of whether the valve main body 11 is open or closed, the first gas can be flown from the first gas flow passage 31 to the third gas flow passage 33 around the periphery of the orifice body 14. The flow rate of the first gas can be controlled by a flow rate control device of an arbitrary mode provided on the upstream side of the first gas flow passage 31, and, using this flow rate control device, the supply of the first gas can be stopped.

Meanwhile, the second gas flow passage 32 communicates with the third gas flow passage 33 only when the valve main body 11 is open, and does not communicate with the third gas flow passage 33 when closed as shown in FIG. 6. Therefore, the supply of the second gas can be controlled by opening and closing the valve main body 11. When the valve main body 11 is open, the second gas runs from the second gas flow passage 32 through the through-hole of the orifice body 14 and the through-hole of the valve seat body 12 and flows into the valve chamber 10a. Then, from the valve chamber 10a, the gas runs through a plurality of gas inflow holes 13b provided in the inner disc 13 and flows into the gap g described above, and then flows to the third gas flow passage 33.

The flow rate of the second gas can be controlled using a flow rate control device provided on the upstream side of the second gas flow passage 32, but the second gas is supplied through an orifice 18. Therefore, when the flow rate control device on the upstream side of the second gas flow passage 32 is a pressure-type flow rate control device including a control valve, a pressure sensor, and a computation control unit, and the control valve is controlled based on the pressure on the upstream side of the orifice 18, the flow rate of the second gas supplied through the orifice 18 can be appropriately controlled.

As described above, according to the valve with a built-in orifice 10B shown in FIG. 6, by controlling the valve main body 11, the second gas can be introduced into the first gas with excellent step-up and step-down characteristics, and the mixed gas can be appropriately flown to the third flow passage 33.

In the valve with a built-in orifice 10B, in order to allow for communication between the first flow passage 31 and the third flow passage 33, the gap g is designed to be relatively large. In addition, similarly to the valve with a built-in orifice 10 of Embodiment 1, the orifice body 14 is composed of first and second metal members 15 and 16 and an orifice plate 17. However, the second metal member 16 is inserted into a lower portion of the narrow-diameter section 2N, which is even narrower, with high sealing properties. Therefore, in this embodiment, the narrow-diameter section 2N is designed to have a relatively large level difference such that the diameter is greater in the upper part and smaller in the lower part. However, also in this embodiment, the diameter of the first metal member 15 may be made smaller than the diameter of the second metal member 16, for example, thereby ensuring a large gap g and keeping the sealing properties high while making the diameter of the narrow-diameter section 2N uniform.

Figure 7:
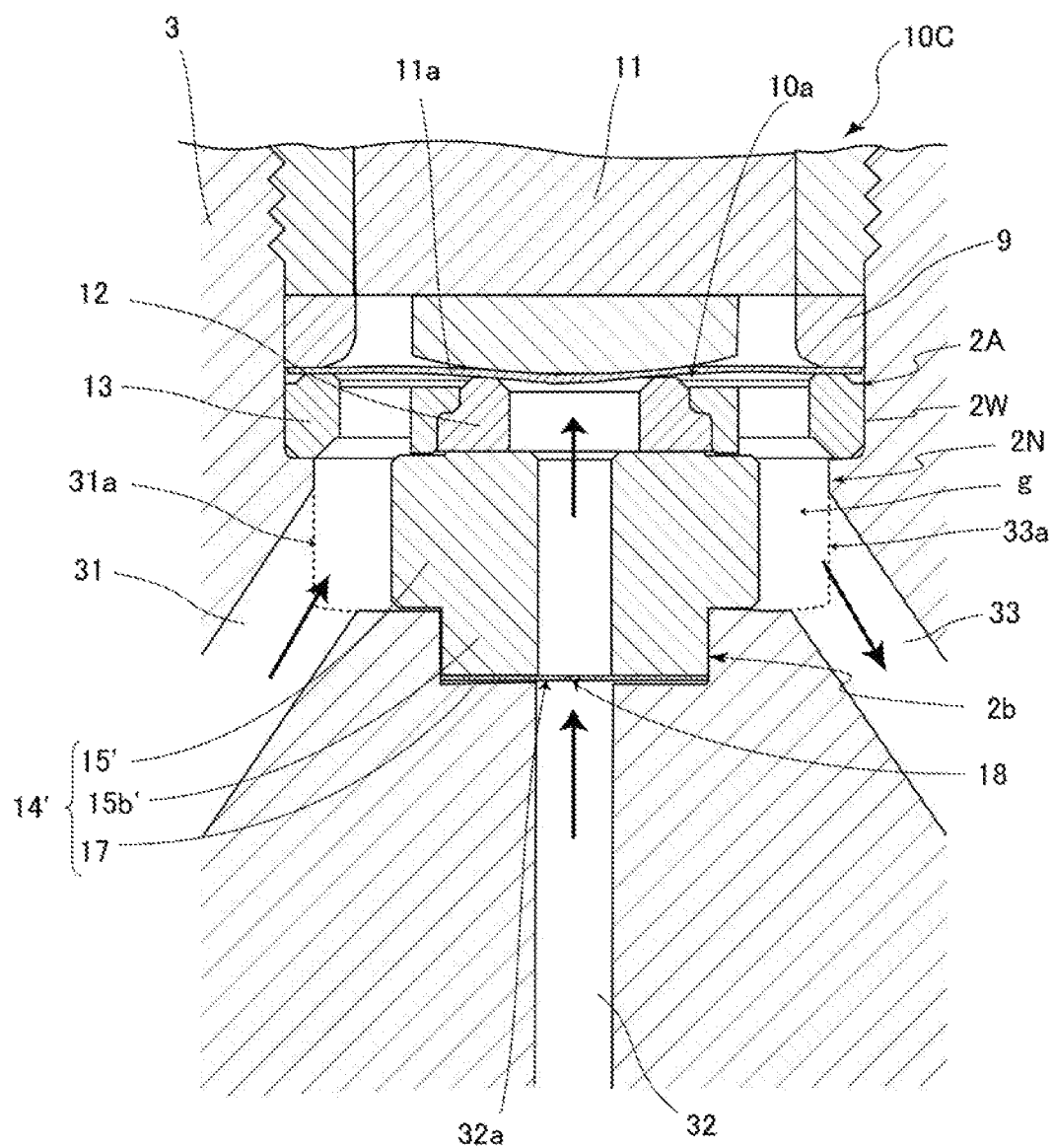
FIG. 7 A partially enlarged view of a valve with a built-in orifice according to a variation of Embodiment 2 of the present invention.

FIG. 7 shows a valve with a built-in orifice 10C according to a variation of Embodiment 2. Similarly to the valve with a built-in orifice 10B shown in FIG. 6, the valve with a built-in orifice 10C of the variation is also for use as a three-way valve and includes a first gas flow passage 31, a second gas flow passage 32, and a third gas flow passage 33 communicating with a housing recess 2A.

However, in the valve with a built-in orifice 10C, the orifice body 14' is composed of a single metal member 15' and an orifice plate 17. In addition, the orifice plate 17 is sandwiched between a protruding portion 15b' provided below the metal member 15' and the bottom surface of a housing recess 2A of a base section 3.

In this variation, in the bottom surface of the narrow-diameter section 2N, a bottom recess 2b capable of housing the protruding portion 15b' of the orifice body 14' and the orifice plate 17 is provided. The diameter of the bottom recess 2b is designed to match the outer diameter of the protruding portion 15b'. The protruding portion 15b' of the orifice body 14' is air-tightly fitted into the bottom recess 2b by press-fitting, and a sealing surface is formed between the protruding portion 15b' and the bottom recess 2b.

As a result, in the valve with a built-in orifice 10C, without using the sealing member 19 included in the valve with a built-in orifice 10/10B shown in FIG. 2 and FIG. 6, the sealing properties between the second flow passage 32 and the first and third flow passages 31 and 33 can be ensured with a reduced number of components.

However, also in this variation, a sealing member 19 may be provided to achieve more reliable sealing. In addition, in the valve with a built-in orifice 10 of Embodiment 1, as in this variation, it is also possible that an orifice plate is mounted on the bottom recess provided in the bottom surface of the narrow-diameter section, and a single metal member having a protruding portion is fitted thereon to secure the orifice plate. In addition, although a mode in which the protruding portion 15b' of the orifice body 14' is fitted into the bottom recess 2b provided in the base section 3 has been described above, it is also possible that a bottom projection provided to the base section 3 is fitted into a recess provided in the bottom of the orifice body 14'.

Embodiment 3

Figure 8:
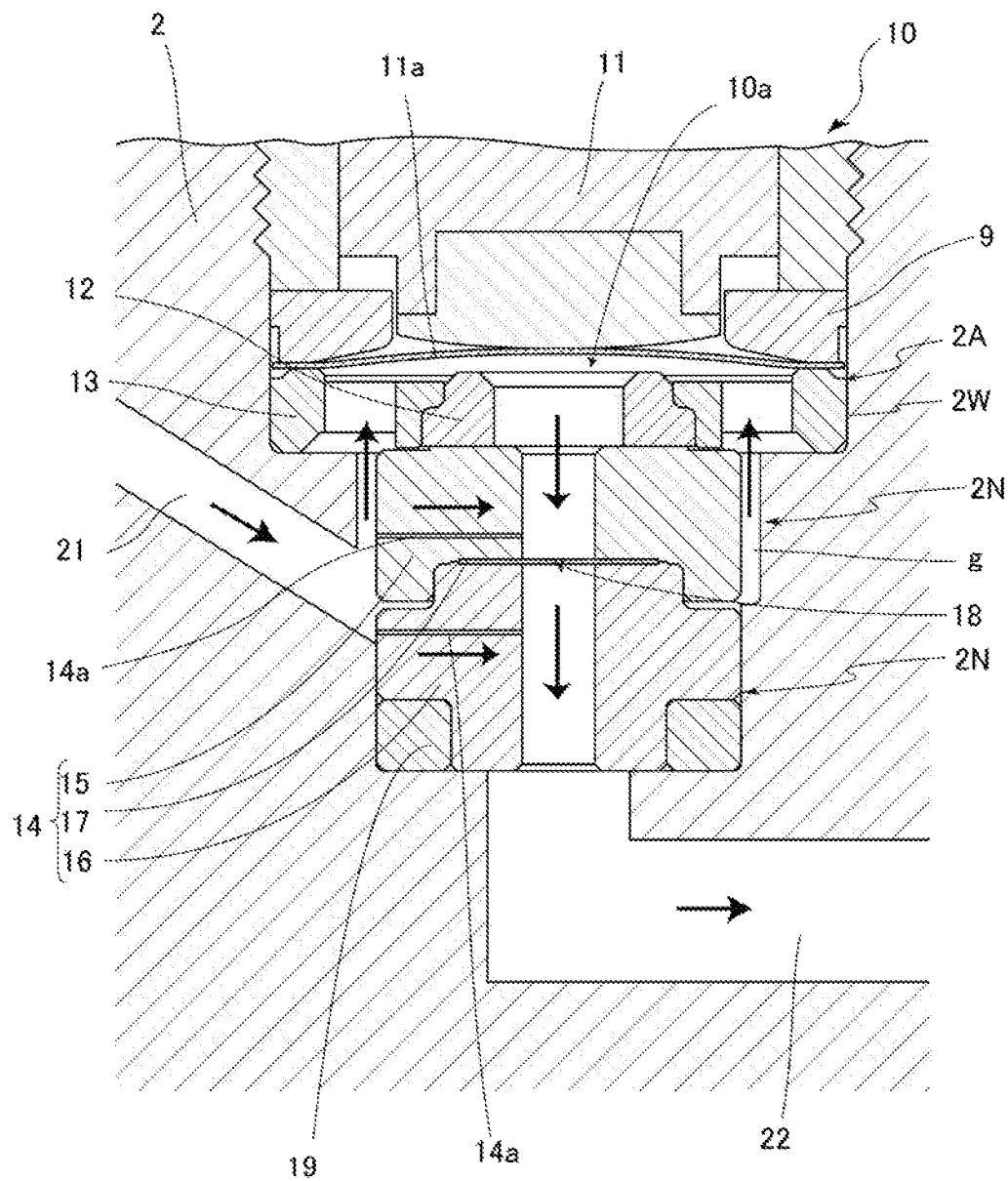
FIG. 8 A partially enlarged view of a valve with a built-in orifice according to Embodiment 3 of the present invention.

FIG. 8 shows a valve with a built-in orifice 10D of Embodiment 3. The valve with a built-in orifice 10D is different from the valve with a built-in orifice 10 of Embodiment 1 in that the orifice body 14 has a small-diameter tunnel (passage) 14a extending in the radial direction. In other respects, the configuration is the same as that of the valve with a built-in orifice 10 of Embodiment 1, and thus the detailed description thereof will be omitted here.

As shown in FIG. 8, the tunnel 14a may be provided to pass through from the outer peripheral side surface of a first metal member 15 to its through-hole in the central portion so that a gas inflow passage 12 communicates with the upstream side of an orifice 18, or may also be provided to pass through from the outer peripheral side surface of a second metal member 16 to its through-hole in the central portion so that the gas inflow passage 12 communicates with the downstream side of the orifice 18. Alternatively, in order for the gas inflow passage 12 to communicate with both the upstream side and the downstream side of the orifice 18, the above two positions may each be provided with the tunnel 14a. In addition, although the tunnel 14a is provided by the side of the gas inflow passage 12 in the mode shown in the figure, it may also be provided to arbitrary points of the outer peripheral side surface of the orifice body 14. A plurality of tunnels 14a communicating with the upstream side of the orifice 18 may be provided, or a plurality of tunnels 14a communicating with the downstream side of the orifice 18 may also be provided.

When the tunnel 14a described above is provided, even when the valve element 11a is closed, low-flow leakage occurs from the gas inflow passage 12 to the gas outflow passage 22, allowing the valve to serve as a leak valve. In this configuration, when the valve element 11a is closed, a gas flows at a low flow rate through the tunnel 14a, while when the valve element 11a is open, the gas can be flowed at a higher flow rate through the original flow passage running through the valve chamber 10a.

When a tunnel 14a leading to the orifice upstream side is provided, it is necessary that the diameter of the tunnel 14a is smaller than the diameter of the orifice 18. As a result, when the valve element 11a is closed, a gas flows at a low flow rate determined by the diameter of the tunnel 14a, which is smaller than the orifice diameter, while when the valve element 11a is open, the gas flows at a flow rate determined by the orifice diameter. Meanwhile, when a tunnel 14a leading to the orifice downstream side is provided, its diameter may be arbitrary. When the valve element 11a is closed, a gas flows only through the tunnel 14a, while when the valve element 11a is open, the gas flows through both the orifice 18 and the tunnel 14a.

As described above, when the valve is used as a leak valve, and the flow rate is changed by opening and closing the valve, for example, the function as a variable-flow pressure-type flow rate control device can be achieved. As a variable-flow pressure-type flow rate control device, a device configured such that an orifice plate is disposed in each of two or more flow-diverting passages, and the flow passage is selected by switching the valve, thereby changing the controlled flow rate, is known. Also in the valve with a built-in orifice 10D of this embodiment described above, similarly, the controlled flow rate can be changed by switching the valve.

INDUSTRIAL APPLICABILITY

A valve with a built-in orifice according to an embodiment of the present invention is particularly suitable for use in a pressure-type flow rate control device.

REFERENCE SIGNS LIST

1: Pressure-type flow rate control device
2: Base section
2A: Housing recess
2N: Narrow-diameter section
2W: Wide-diameter section
3: Control valve
4: Pressure sensor
5: Computation control unit
9: Pressing member
10: Valve with a built-in orifice
10a: Valve chamber
11: Valve main body
11a: Valve element
12: Valve seat body
12a: Through-hole
12b: Valve seat
13: Inner disc
14: Orifice body
15: First metal member 15a: Through-hole
15b: Recess
15x: Protrusion
16: Second metal member
16a: Through-hole
16b: Projection
16x: Protrusion
17: Orifice plate
18: Orifice
19: Sealing member
20: Flow passage
21: Gas inflow passage (first gas flow passage)
22: Gas outflow passage (second gas flow passage)
31: First gas flow passage
32: Second gas flow passage
33: Third gas flow passage

The invention claimed is:

1. A valve with a built-in orifice, internally having an orifice, comprising:
   a base section having a top-opening housing recess, a first gas flow passage opening to a wall surface of the housing recess, and a second gas flow passage opening to a bottom surface of the housing recess;
   a valve seat body having an annular valve seat and a through-hole formed on an inner side of the valve seat;
   an inner disc for holding and securing the valve seat body;
   a valve element configured to capable of coming in and out of contact with the valve seat; and
   an orifice body having a through-hole including the orifice, wherein
   the housing recess is a stepped recess having a wide-diameter section and a narrow-diameter section opening to a bottom surface of the wide-diameter section, the wide-diameter section includes a valve chamber defined by the valve seat body, the inner disc, and the valve element, and the narrow-diameter section has inserted therein the orifice body;
   the valve seat body is mounted on the orifice body, and is pressed by the inner disc and thereby held and secured on top of the orifice body; and
   the first gas flow passage communicates with the valve chamber through a space between a wall surface of the narrow-diameter section and the orifice body, and the second gas flow passage communicates with the valve chamber through the through-hole of the orifice body and the through-hole of the valve seat body.

2. The valve with a built-in orifice according to claim 1, wherein the base section further comprises a third gas passage opening to the wall surface of the housing recess.

3. The valve with a built-in orifice according to claim 1 or 2, wherein the orifice body has in a side surface thereof a passage communicating with the through-hole of the orifice body.

4. The valve with a built-in orifice according to claim 1, wherein
   the orifice body includes a first metal member having a through-hole, a second metal member having a through-hole, and an orifice plate provided with the orifice and sandwiched between the first metal component and the second metal component,
   the first metal member has a recess or projection on the side facing the second metal member, the second metal member has a projection or recess shaped to fit with the recess or projection of the first metal member, and the orifice plate is air-tightly sandwiched between the recess or projection of the first metal member and the projection or recess of the second metal member.

5. The valve with a built-in orifice according to claim 4, wherein an annular protrusion is provided on at least one of a surface of the first metal member facing the second metal member and a surface of the second metal member facing the first metal member.

6. The valve with a built-in orifice according to claim 1, further comprising an annular sealing member sealing between the orifice body and the bottom of the narrow-diameter section.

7. The valve with a built-in orifice according to claim 1, wherein the orifice body has formed on an upper end surface thereof a step upper surface and a step lower surface formed to have a smaller height than the step upper surface, and the inner disc does not contact with the upper end surface of the orifice body.

8. The valve with a built-in orifice according to claim 1, wherein the upper end surface of the orifice body and the bottom surface of the wide-diameter section are approximately the same in height.

9. The valve with a built-in orifice according to claim 1, wherein the inner disc is mounted on the bottom surface of the wide-diameter section.

10. The valve with a built-in orifice according to claim 9, wherein the valve element is a metal diaphragm, and the metal diaphragm is sandwiched and secured between the inner disc and a pressing member pressing the inner disc from above.

11. A pressure-type flow rate control device comprising a control valve, a pressure sensor, a computation control unit, and the valve with a built-in orifice according to claim 1.

* * * * *